H. B. MARGRAVE.
MEAT CUTTER.
APPLICATION FILED DEC. 14, 1914.
1,191,016.
Patented July 11, 1916.
2 SHEETS—SHEET 1.
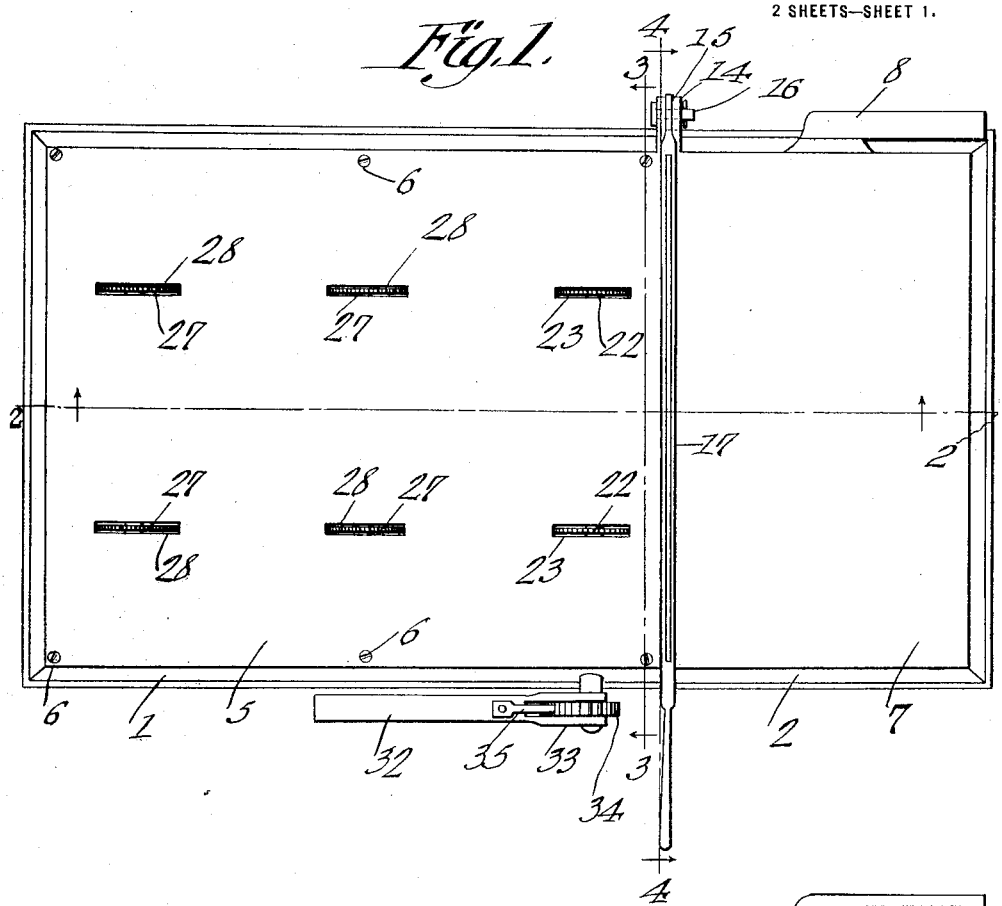
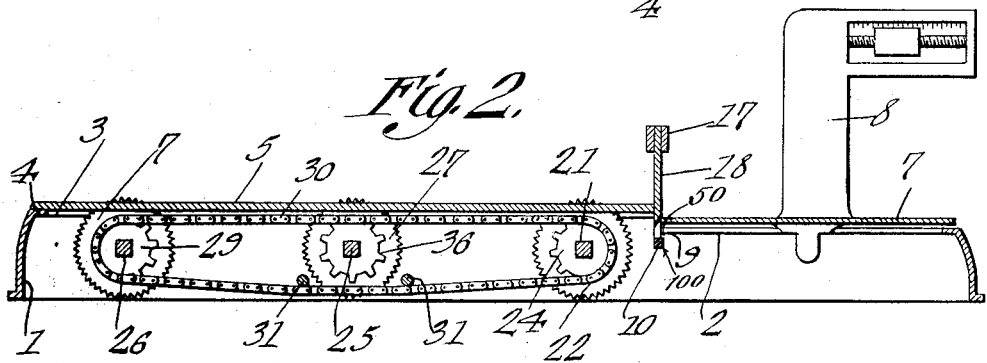
Witnesses
H. B. Margrave
Inventor
by
Attorneys H. B. MARGRAVE.
MEAT CUTTER.
APPLICATION FILED DEC. 14, 1914.
1,191,016.
Patented July 11, 1916.
2 SHEETS—SHEET 2.
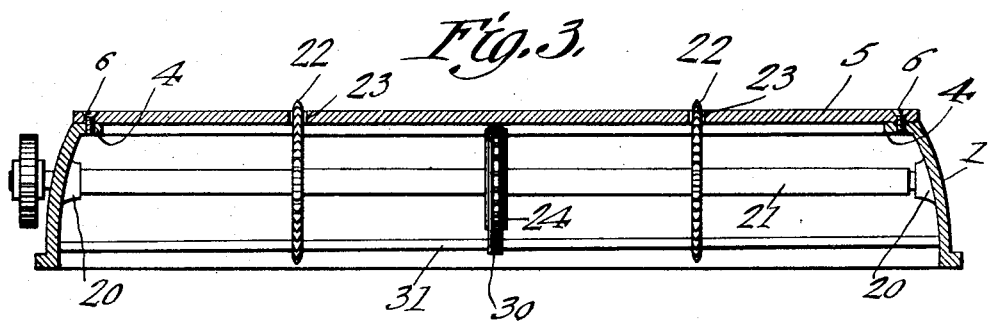
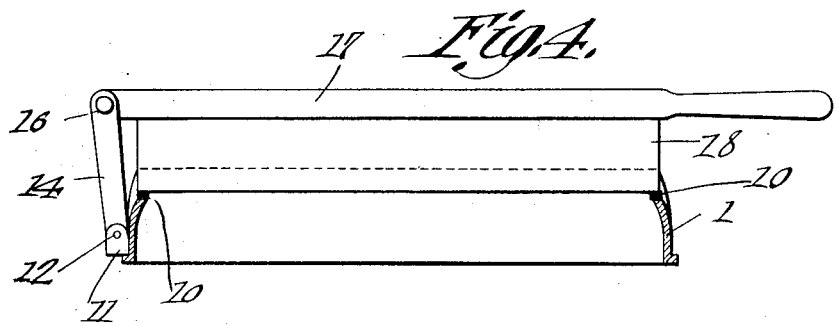
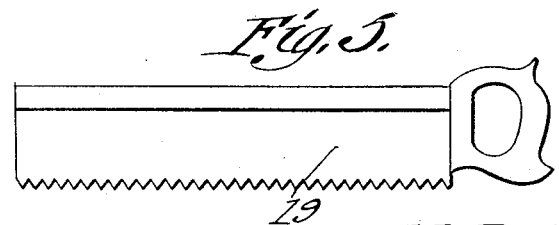
Witnesses
H. B. Margrave
Inventor
by
Attorneys

UNITED STATES PATENT OFFICE.

HENRY B. MARGRAVE, OF HARRIMAN, TENNESSEE.

MEAT-CUTTER.

1,191,016. Specification of Letters Patent. Patented July 11, 1916.

Application filed December 14, 1914. Serial No. 877,184.

*To all whom it may concern:*

Be it known that I, HENRY B. MARGRAVE, a citizen of the United States, residing at Harriman, in the county of Roane and State of Tennessee, have invented a new and useful Meat-Cutter, of which the following is a specification.

The device forming the subject matter of this application is a meat cutter, and one object of the invention is to provide novel means for feeding the meat toward the cutting mechanism.

Another object of the invention is to improve the construction of the cutting mechanism.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings: Figure 1 shows the invention in top plan; Fig. 2 is a longitudinal section along the line 2—2 of Fig. 1; Fig. 3 is a cross section on the line 3—3 of Fig. 1; Fig. 4 is a cross section along the line 4—4 of Fig. 1; Fig. 5 is an elevation showing the auxiliary saw.

In carrying out the present invention there is provided a supporting structure embodying a marginal rim 1, one portion of the upper edge of which, denoted by the numeral 2, is disposed at a slightly lower elevation than the remaining portion 3 of the upper edge of the rim 1, as Fig. 2 will most clearly disclose. The portion 3 of the periphery of the rim 1 may be equipped with an inwardly projecting flange 4 supporting a fixed platform 5, the latter being held to the flange 4 by means of securing elements 6. Disposed above the lower portion 2 of the rim 1 is a vertically movable platform 7 constituting a part of a weighing device 8 of any desired construction, the movable scale platform 7 being disposed slightly below the fixed platform 5 across which the meat is fed. In opposed portions of the rim 1 and at the inner ends of the platforms 5 and 7, blade-receiving notches 9 are formed and at the bases of these notches are lodged resilient stop blocks 10 located in enlarged recesses 100. The blocks may be made of rubber or some other suitable material, and are held down by overhanging fingers 50.

The rim 1 carries an exterior lug 11 supporting a pivot element 12 on which is mounted to swing a link 14 bifurcated at its upper end to form arms 15 across which extends a removable pin 16, forming a pivotal support for a knife, the handle forming rib of which is shown at 17 and the blade of which is denoted by the numeral 18. The blade 18 of the knife is adapted to enter the notches 9 and to prevent a dulling of the cutting edge of the blade, the same is received by the resilient stop blocks 10 in the notches. If desired, the knife may be swung rearwardly with the pin 16 as the center of swinging movement, the link 14 being adapted to swing rearwardly, the operation above described being such that the knife may be carried to one side of the rim 1 thereby to permit the use of a saw 19 in the place of the knife and to permit the endwise insertion of one of the stop blocks 10 beneath one of the fingers 50. The knife is adapted to cut clear meat, and the saw 19 is employed for severing bones. The pivotal connection afforded by the pin 16 between the rib 17 of the knife and the link 14 may be replaced by any mechanical equivalent therefor.

As shown in Fig. 3, opposed portions of the rim 1 thereby to permit the use of a saw bosses 20 in which is journaled for rotation a drive shaft 21, the latter being located, preferably, comparatively close to the knife 17—18. One end of the drive shaft 21 protrudes through the rim 1. Secured to the drive shaft 21 are toothed feed wheels 22 which extend upwardly through slots 23 in the platform 5. Secured to the drive shaft 21 and located between the feed wheels 22 is a sprocket wheel 24. An intermediate shaft 25 is journaled for rotation in the rim 1 after the manner of the drive shaft 21, saving for the fact that one end of the shaft 25 does not protrude through the rim 1 as is the case with one end of the drive shaft 21.

A terminal shaft 26 is journaled in the rim 1 as has been described hereinbefore in connection with the shaft 25. The shafts 25 and 26 carry toothed feed wheels 27 projecting through slots 28 in the platform 5. Attached to the shaft 26 is a sprocket wheel 29 and a sprocket wheel 36 is mounted on the shaft 25. Trained about the sprocket wheels 24 and 29 is a sprocket chain 30, the upper run of which engages the sprocket wheel 36 on the shaft 25, the lower run of the sprocket chain 30 being held apart from the lower edge of the sprocket wheel 36 by means of transverse rods 31 connecting opposed portions of the rim 1.

The means for actuating the drive shaft 21 embodies a lever 32 having bifurcations 33 receiving the protruding end of the drive shaft, the lever thus being mounted to swing upon the drive shaft. Secured to the protruding end of the drive shaft 21 between the bifurcations 33 of the lever 32 is a ratchet wheel 34 adapted to be engaged by a pawl 35 attached to the lever.

In practical operation, the chunk of meat which is to be sliced is placed upon the fixed platform 5 in contact with the feed wheels 22 and 27. Then the drive shaft 21 is rotated, motion being imparted thereto by means of the lever 33, the pawl 35 thereon, and the ratchet wheel 34 which is secured to the drive shaft. When the drive shaft 21 is rotated, the shafts 25 and 26 will be rotated through the medium of the sprocket wheels 36, 29 and 24, and the chain 30. The feed wheels 27 and 22 will thereupon advance the meat toward the cutter 18—17 and when the latter is reciprocated vertically, a slice of a predetermined thickness will be cut off. Should a bone be encountered, the cutter 18—17 may be swung rearwardly as hereinbefore described, the cutter being replaced by the saw 19. The severed slice drops onto the scale platform 7 and if a paper be placed on the scale platform it will be obvious that the meat need not be handled after it is cut.

Obviously, any desired number of intermediate shafts 25 may be employed, the number of feed wheels being increased accordingly. The transverse rods 31 serve to maintain the drive chain 30 taut, so that the same will engage properly with the sprocket wheel 36 on the shaft 25.

Having thus described the invention, what is claimed is:—

In a meat cutter, a supporting structure including a rim having opposed notches in its upper edge, the notches terminating at their lower ends in enlarged recesses defining overhanging fingers; stop blocks insertible endwise into the recesses and held therein against upward movement by the fingers; a platform carried by the rim and terminating adjacent the notches; a link pivoted at its lower end to the rim; and a cutter pivoted to the upper end of the link and adapted to enter the notches and to coöperate with the stop blocks, the link and the cutter being adapted to be swung laterally, to permit the endwise insertion of one of the stop blocks into one of the recesses.

In testimony that I claim the foregoing as my own, I have hereto affixed my signature in the presence of two witnesses.

HENRY B. MARGRAVE.

Witnesses:
M. F. D. WALLIN,
C. E. DEATHERAGE.